(12) United States Patent
Chang et al.

(10) Patent No.: US 7,596,468 B2
(45) Date of Patent: Sep. 29, 2009

(54) METHOD FOR MEASURING A SELECTED PORTION OF A CURVED SURFACE OF AN OBJECT

(75) Inventors: Chih-Kuang Chang, Taipei Hsien (TW); Xin-Yuan Wu, Shenzhen (CN); Min Wang, Shenzhen (CN); Hua Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/179,590

(22) Filed: Jul. 25, 2008

(65) Prior Publication Data

US 2009/0112511 A1    Apr. 30, 2009

(30) Foreign Application Priority Data

Oct. 31, 2007   (CN) .................... 2007 1 0202337

(51) Int. Cl.
*G01B 21/20* (2006.01)
(52) U.S. Cl. .................. 702/167; 702/166; 345/418; 345/419; 345/420; 382/153; 382/154; 382/312; 356/600; 356/614

(58) Field of Classification Search ......... 702/166–167; 345/418–420; 382/153–154, 312; 356/600, 356/614
See application file for complete search history.

(56) References Cited

U.S. PATENT DOCUMENTS

| | | | |
|---|---|---|---|
| 6,580,425 B1 * | 6/2003 | Zwicker et al. | 345/420 |
| 7,190,826 B2 * | 3/2007 | Russell et al. | 382/154 |
| 7,313,264 B2 * | 12/2007 | Crampton | 382/154 |

\* cited by examiner

*Primary Examiner*—Tung S Lau
*Assistant Examiner*—Sujoy K Kundu
(74) *Attorney, Agent, or Firm*—Frank R. Niranjan

(57) ABSTRACT

A computer-implemented method for measuring a selected portion of a curved surface of an object is disclosed. The method includes the blocks of displaying a straight-line across an object, stretching the straight-line to form a plane, determining intersection points between the plane and the curved surface of the object, determining a vertical point of each point-cloud around the straight-line on the curved surface, a corresponding vertical distance, and a corresponding normal vector, projecting the vertical points onto the plane vertically, determining measured points, up tolerance points, and down tolerance points for the point-clouds around the straight-line on the plane, connecting the corresponding points to lines, and determining if one or more the dimensions of a selected portion around the straight-line of the object is acceptable according to the connected lines.

10 Claims, 9 Drawing Sheets

METHOD FOR MEASURING A SELECTED PORTION OF A CURVED SURFACE OF AN OBJECT

BACKGROUND

1. Field of the Invention

Embodiments of the present disclosure relate to measuring methods, and more particularly to a method for measuring a selected portion of a curved surface of an object.

2. Description of Related Art

A point-cloud is a set of 3D points describing the outlines or surface features of the object. The point cloud is often created by scanning a surface of an object utilizing a three-dimensional (3D) scanner, such as a coordinate measuring machine, for example. Multiple scans, or even hundreds of scans, from different directions are usually required to obtain information about all exterior surfaces of the object. If color information is scanned at each point, the colors on the surface of the object can also be obtained. Then, the point-clouds of the object are transferred to a computer for further processing by point-cloud measuring software, such as computer aided design (CAD) or computer aided manufacture (CAM), so as to create a complete digital, 3D model of the object that can be used in a wide variety of applications.

However, the existing point-cloud measuring software cannot measure just a selected portion of a curved surface of the object. If multiple selected portions of an object need to be measured, it must be done manually, which is inefficient, resulting in decreased productivity.

Therefore, what is needed is a method for measuring a selected portion of a curved surface of an object, utilizing a computer module instead of manual, so as to improve the accuracy and efficiency of measuring.

SUMMARY

A computer-implemented method for measuring a selected portion of a curved surface of an object is provided. The method includes the blocks of: (a) displaying a straight-line across the object along an axial vector of an X-axis of a current visual angle; (b) stretching the straight-line to form a plane according to an axial vector of a Z-axis of the current visual angle, and determining a plurality of intersection points between the plane and the curved surface of the object, wherein the curved surface of the object comprises a plurality of point-clouds; (c) determining a vertical point of each point-cloud around the straight-line on the curved surface, a corresponding vertical distance from each of the point-clouds to the curved surface, and a corresponding normal vector of a vertical line from each of the point-clouds to the curved surface; (d) projecting the vertical points onto the plane vertically so as to generate projections of the point-clouds on the plane; (e) determining a plurality of measured points, a plurality of up tolerance points, and a plurality of down tolerance points for each of the plurality of the point-clouds around the straight-line on the plane according to the projections, the corresponding vertical distance, and the corresponding normal vector of the vertical line; (f) connecting each of the measured points so as to generate a measured line, connecting the intersection points between the plane and the curved surface so as to generate an intersection line, connecting each projection and a corresponding measured point of each of the projections so as to generate connected lines, connecting the up tolerance points so as to generate an up tolerance line, and connecting the down tolerance points so as to generate a down tolerance line; (g) determining if one or more dimensions of a selected portion around the straight-line of the object is acceptable by determining one of if a deviation of the measured line from the intersection line is acceptable, and by determining if each connected line is inside an area between the up tolerance line and the down tolerance line.

Other systems, methods, features, and advantages of the present invention will become apparent to one with skill in the art upon examination of the following drawings and detailed description.

DETAILED DESCRIPTION OF CERTAIN INVENTIVE EMBODIMENTS

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Figure 1:
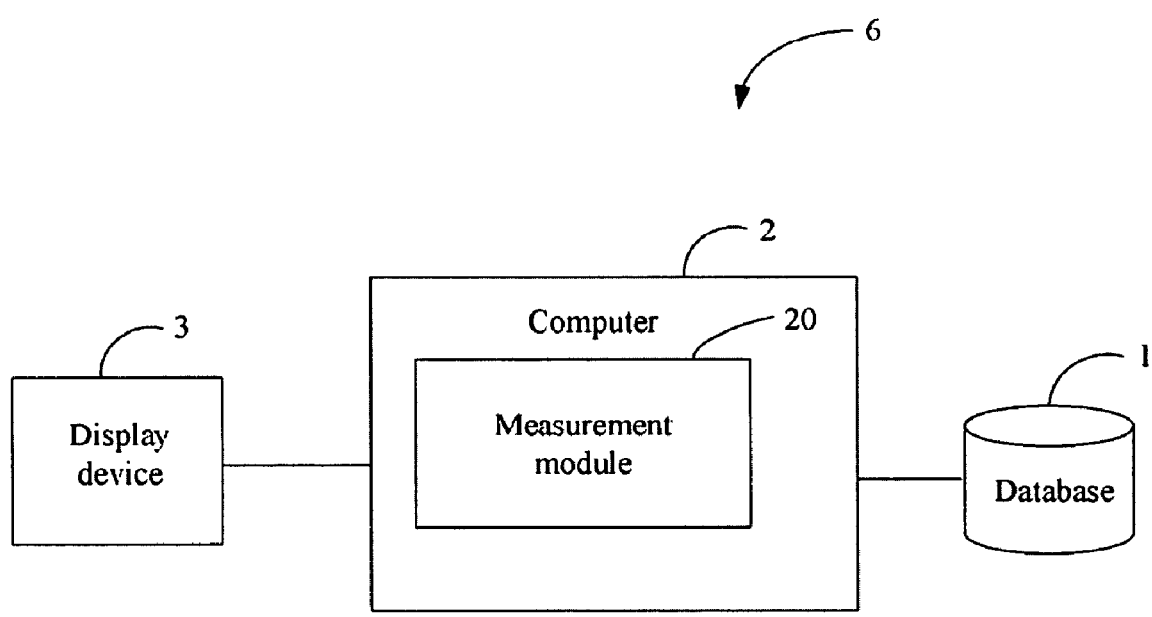
FIG. 1 is a schematic diagram of one embodiment of a system for measuring a selected portion of a curved surface of an object.

FIG. 1 is a schematic diagram of one embodiment of a system 6 for measuring a selected portion of a curved surface of an object. In one embodiment, the system 6 includes a database 1, a computer 2 connected to the database 1, and a display device 3 connected to the computer 2. The database 1 stores a plurality of point-clouds of an object, and measured data of a plurality of curved surfaces of the object based on a computer aided design (CAD) model during the measuring process. The measured data may include a triangular grid of the plurality of curved surface of the object, vertexes of each triangle in a triangular grid, and coordinates of each vertex of each triangle in the triangular grid. In one embodiment, the object may be measured by a three-dimensional (3D) scanner, such as a laser scanner.

The computer 2 includes a measurement module 20. The measurement module 20 is configured for controlling and/or performing a measuring of the object. The display device 3 is configured for providing an graphical user interface to display curved surfaces of the object, and also to display a measuring result. In one embodiment, the measuring result may include an up tolerance line, a down tolerance line, a standard line, and a measured line, for example. The display color of each line (e.g., the up tolerance line, the down tolerance line, the standard line, and the measured line) may be set according to a user demand. For example, the display color of the up tolerance line can be red, the display color of the down tolerance line can be blue, the display color of the standard line can be green, and the display color of the measured line can be white.

Figure 2:
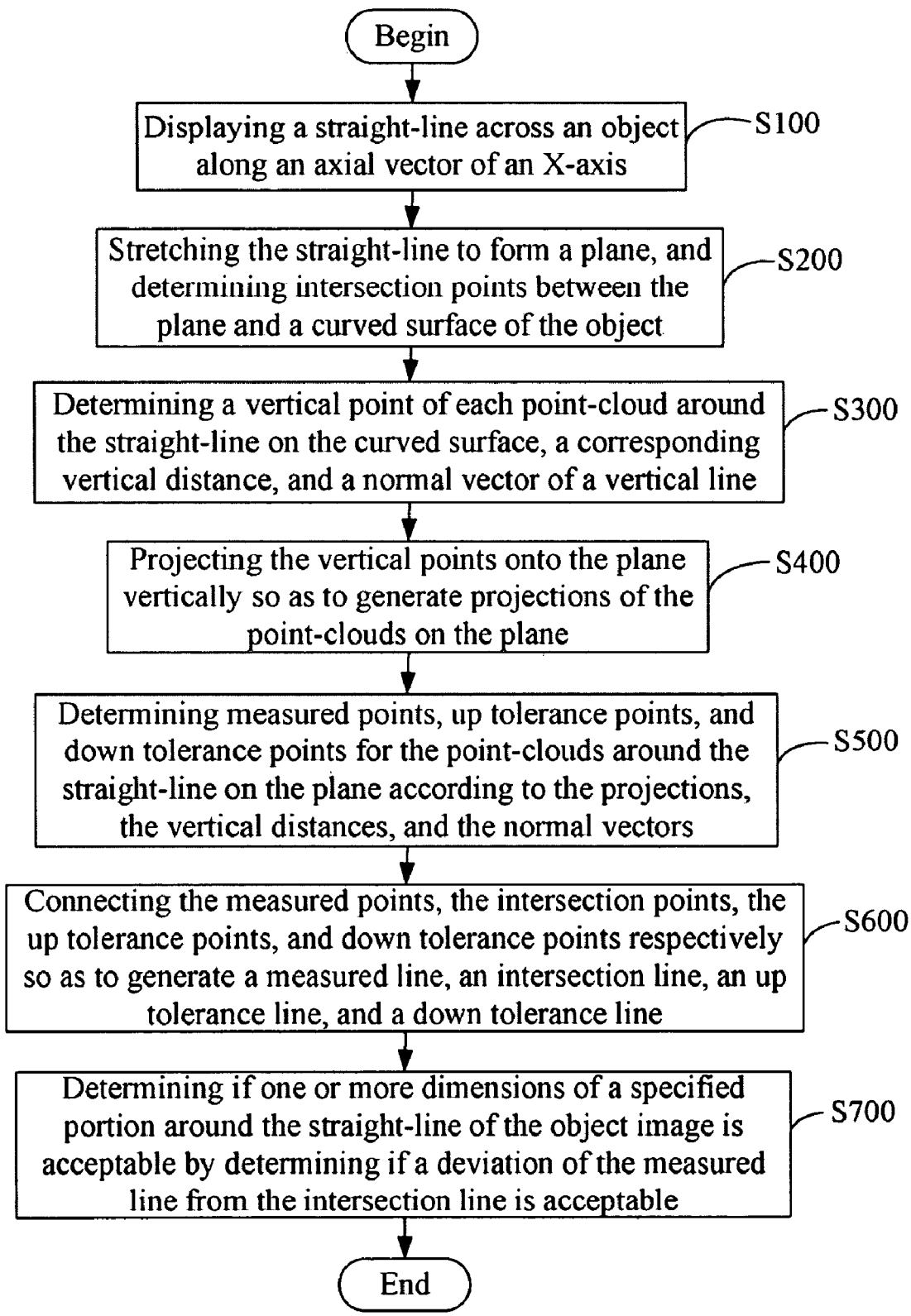
FIG. 2 is a flowchart of one embodiment of a method for measuring a selected portion of a curved surface of an object.
Figure 7:
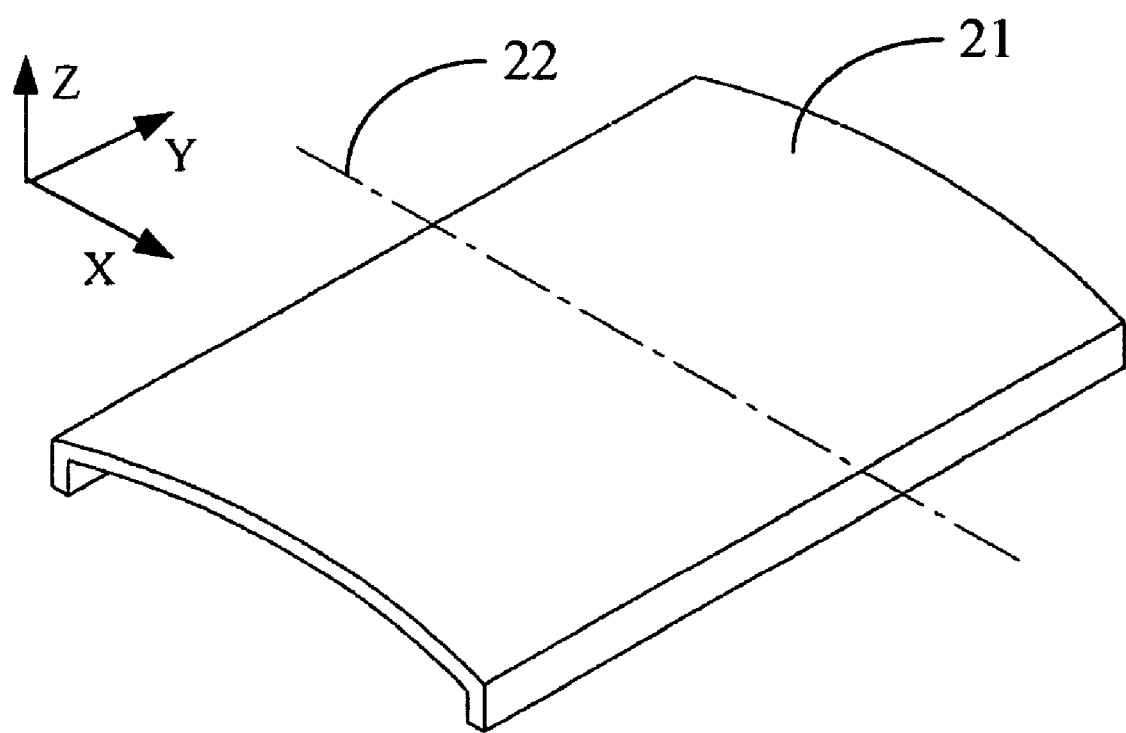
FIG. 7 is a schematic diagram of an object and a straight-line across the object.

FIG. 2 is a flowchart of one embodiment of a method for measuring a selected portion of a curved surface of an object 21. The method of FIG. 2 may be used to measure a selected portion of the curved surface of the object positioned in a measuring machine. In block S100, a straight-line 22 may be displayed across the object along an axial vector of an X-axis of a current visual angle (refer to FIG. 7) in order to measure the object as will be further explained hereinafter. As mentioned above, the straight-line may be set to any number of colors for a measuring result of the object 21. In the embodiment of FIG. 2, the selected portion of the curved surface of the object (hereinafter, referred to as "the curved surface") defines a selected rectangle enclosing the straight-line 22.

Figure 8:
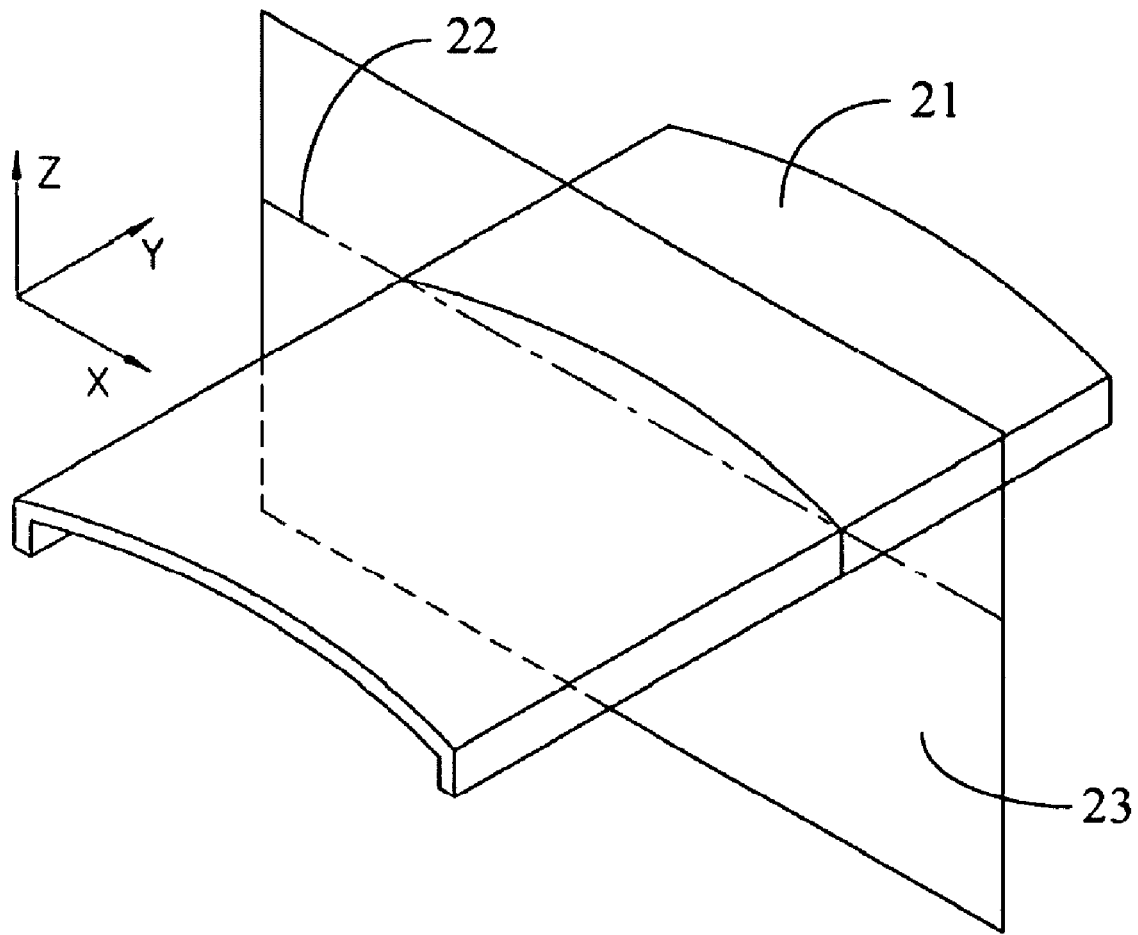
FIG. 8 is a schematic diagram of stretching the straight-line in FIG. 7 to a plane according to an axial vector of a Z-axis of the current visual angle.

In block S200, the measurement module 20 stretches the straight-line to form a plane 23 according to an axial vector of a Z-axis of the current visual angle (refer to FIG. 8), and determines a plurality of intersection points between the plane 23 and the curved surface. The curved surface of the object stores a plurality of point-clouds.

In block S300, the measurement module 20 determines a vertical point of each point-cloud around the straight-line on the curved surface, a corresponding vertical distance from each of the point-clouds to the curved surface, and a corresponding normal vector of a vertical line from each of the point-clouds to the curved surface.

In block S400, the measurement module 20 projects each of the vertical points from each of the point-clouds onto the plane 23 vertically in order to generate a plurality of projections for each of the of the point-clouds on the plane 23.

In block S500, the measurement module 20 determines a plurality of measured points, a plurality of up tolerance points, and a plurality of down tolerance points for each of the plurality of the point-clouds around the straight-line on the plane according to the projections, the corresponding vertical distance, and the corresponding normal vector of the vertical line. It may be understood that an measured point defines a point-cloud corresponding to a projection on the plane 23. Accordingly, an up tolerance point defines a point-cloud deviated a maximal up tolerance distance from a projection on the plane 23. An down tolerance point defines a point-cloud deviated a minimal down tolerance distance from a projection on the plane 23. A detailed description is as follows. For example, the projections are stored in an array m_ptStds, the vertical distances from the point-clouds to the curved surface are stored in an array triDis, the normal vectors of the vertical lines are stored in an array triVecs, the measured points are stored in an array m_MeasurePts, the up tolerance points are stored in an array m_MeasureUpTols, and the down tolerance points are stored in an array m_MeasureDownTols. A formula for determining a measured point is as follows.

$$m\_MeasurePts[i].x = m\_ptStds[i].x + triDis[i]*triVecs[i].x$$

$$m\_MeasurePts[i].y = m\_ptStds[i].y + triDis[i]*triVecs[i].y$$

$$m\_MeasurePts[i].z = m\_ptStds[i].z + triDis[i]*triVecs[i].z$$

In the formula as described above, "i" represents an array element, represents a multiplication operation, "m_MeasurePts[i].x" represents an X-axis coordinate of the measured point, "m_ptStds[i].x" represents an X-axis coordinate of the projection, "triVecs[i].x" represents an X-axis normal vector of the vertical line; "m_MeasurePts[i].y" represents a Y-axis coordinate of the measured point, "m_ptStds[i].y" represents a Y-axis coordinate of the projections, "triVecs[i].y" represents a Y-axis normal vector of the vertical line; "m_MeasurePts[i].z" represents a Z-axis coordinate of the measured point, "m_ptStds[i].z" represents a Z-axis coordinate of the projections, "triVecs[i].z" represents a Z-axis normal vector of the vertical line; "triDis[i]" represents the vertical distance from the point-cloud to the curved surface.

A formula for determining a up tolerance point is as follows.

$$m\_MeasureUpTols[i].x = m\_ptStds[i].x + MaxTol*triVecs[i].x$$

$$m\_MeasureUpTols[i].y = m\_ptStds[i].y + MaxTol*triVecs[i].y$$

$$m\_MeasureUpTols[i].z = m\_ptStds[i].z + MaxTol*triVecs[i].z$$

In the formula as described above, "MaxTol" represents a value of a maximal up tolerance, "m_MeasureUpTols[i].x" represents an X-axis coordinate of an up tolerance point, "m_MeasureUpTols[i].y" represents a Y-axis coordinate of an up tolerance point, and "m_MeasureUpTols[i].z" represents a Z-axis coordinate of an up tolerance point.

A formula for determining a down tolerance point is as follows.

$$m\_MeasureDownTols[i].x = m\_ptStds[i].x + MinTol*triVecs[i].x$$

$$m\_MeasureDownTols[i].y = m\_ptStds[i].y + MinTol*triVecs[i].y$$

$$m\_MeasureDownTols[i].z = m\_ptStds[i].z + MinTol*triVecs[i].z$$

In the formulas as described above, "MinTol" represents a value of the minimal down tolerance, "m_MeasureDownTols[i].x" represents an X-axis coordinate of the down tolerance point, "m_MeasureDownTols[i].y" represents a Y-axis coordinate of the down tolerance point, and "m_MeasureDownTols[i].z" represents a Z-axis coordinate of the down tolerance point.

Figure 9:
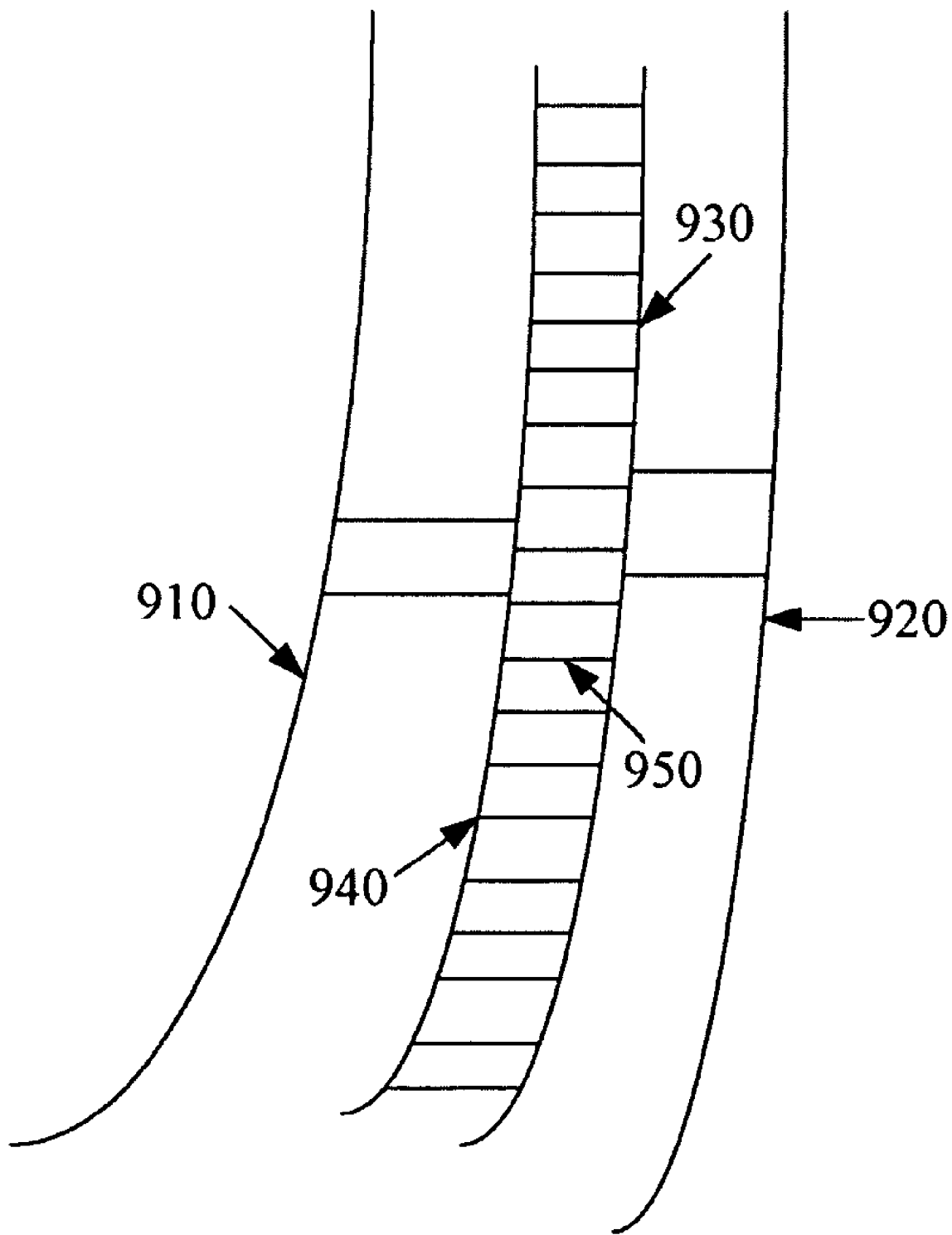
FIG. 9 is a schematic diagram of a measuring result.

In block S600, the measurement module 20 connects each of the plurality of the measured points so as to generate the measured line, connects the intersection points between the plane and the curved surface so as to generate the intersection line (i.e., the standard line), connects each projection and a corresponding measured point of each of the projections so as to generate connected lines, connects the up tolerance points so as to generate the up tolerance line, and connects the down tolerance points so as to generate the down tolerance line. One embodiment of each of the above-mentioned lines is illustrated with respect to FIG. 9. As mentioned above, the measurement module 20 may display each of the lines on the display device 3 with different colors according to the user set information. The results are shown in FIG. 9. In FIG. 9, a first line 910 represents the up tolerance line, a second line 920 represents the down tolerance line, a third line 930 represents the intersection line (i.e., the standard line), a fourth line 940 represents the measured line, and a fifth line 950 represents the connected line between the projection and its corresponding measured point.

In block S700, the measurement module 20 determines thief one or more dimensions of a selected portion around the straight-line of the object is acceptable by determining one of if a deviation of the measured line from the intersection line is acceptable, and by determining if each connected line is inside an area between the up tolerance line and the down tolerance line. In other words, if the deviation of the measured line from the intersection line is beyond the up tolerance line or the down tolerance line, or the connected line is beyond the up tolerance line or the down tolerance line, the measurement module 20 determines that the dimensions of the selected portion around the straight-line of the object is not acceptable. Otherwise, the measurement module 20 determines that the dimensions of the selected portion around the straight-line of the object is acceptable.

In one embodiment, a display color of a line between a projection and the projection corresponding measured point may be set according to different subsections of a tolerance range. For example, if the tolerance range is [−0.350, 0.350], that is, the maximal up tolerance is 0.350 millimeter (mm), and the minimal down tolerance is −0.350 mm. The tolerance range can be divided into subsections such as [−0.350, −0.300], [−0.300, −0.250], . . . , [0.250, 0.300], [0.300, 0.350]. The user can set the display color of the connected lines ranging from −0.350 to −0.300 as dark blue, −0.300 to −0.250 as sky blue, and so on.

Figure 3:
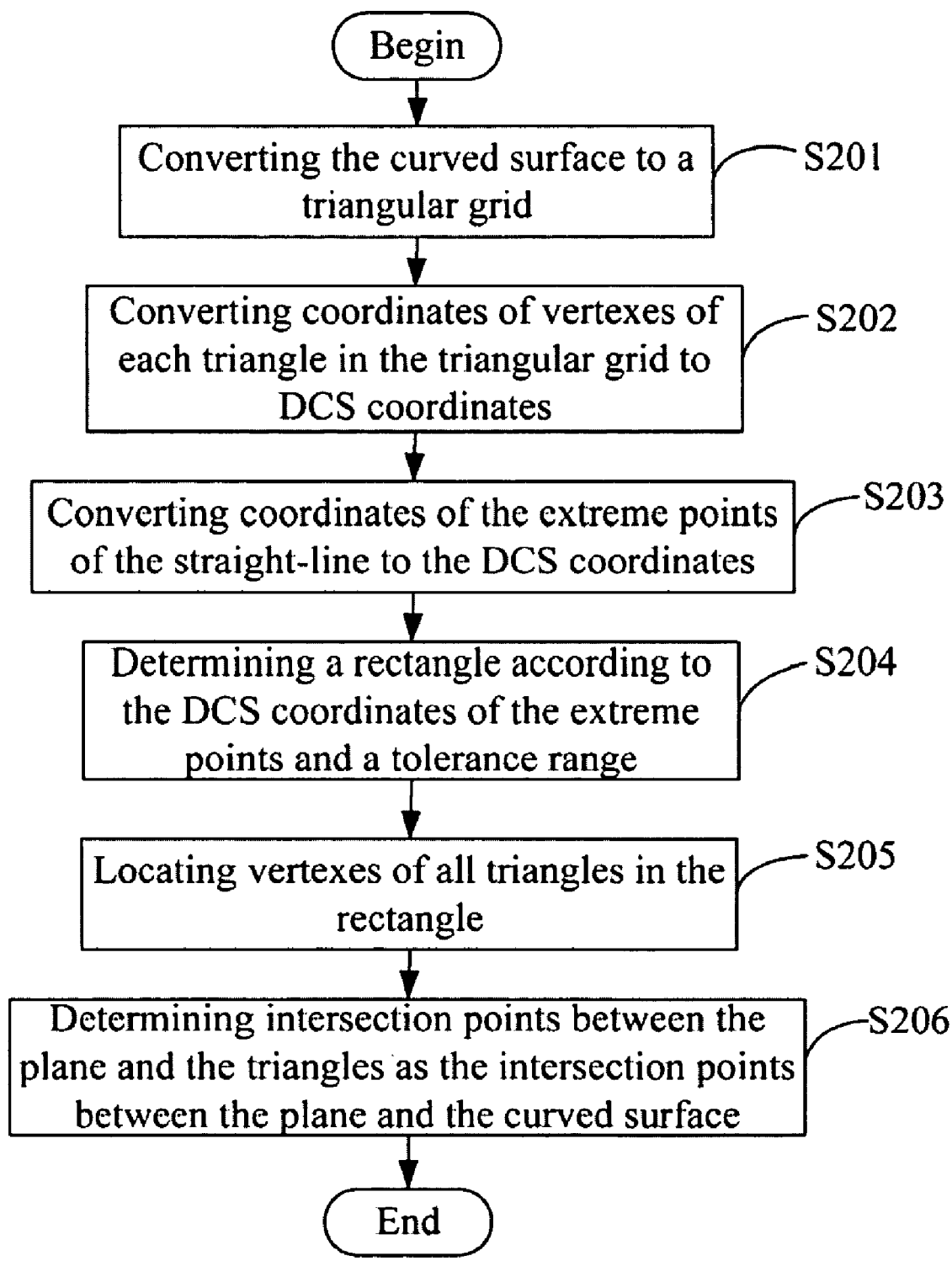
FIG. 3 is a detailed flowchart of block S200 of FIG. 2.

FIG. 3 is a detailed flowchart of block S200 of FIG. 2. In block S201, the measurement module 20 converts the curved surface to the triangular grid, wherein vertexes of each triangle in the triangular grid can be expressed in the world coordinate system (WCS).

In block S202, the measurement module 20 converts the WCS coordinates of vertexes of each triangle in the triangular grid to a display coordinate system (DCS) coordinates, wherein a straight-line comprises two extreme points. In other words, the measurement module 20 converts the world coordinate system (WCS) coordinates of the vertexes of each triangle in the triangular grid to the DCS coordinates.

In block S203, the measurement module 20 converts coordinates of the two extreme points of the straight-line to the DCS coordinates. In other words, the measurement module 20 converts the WCS coordinates of the extreme points of the straight-line to the DCS coordinates.

In block S204, the measurement module 20 determines a rectangle according to the DCS coordinates of the extreme points and the tolerance range. The width of the rectangle is an absolute value of a difference of the X-axis coordinates of the two extreme points. The height of the rectangle is a value of a difference between a maximal up tolerance and a minimal down tolerance in the tolerance range. For example, the tolerance range is [−0.350, 0.350], the maximal up tolerance is 0.350 mm, and the minimal down tolerance is −0.350 mm. Therefore, the height of the rectangle is 0.7 mm.

In block S205, the measurement module 20 locates vertexes of all triangles in the rectangle. In block S206, the measurement module 20 determines intersection points between the plane and the triangles as the intersection points between the plane and the curved surface, wherein each of the triangles has at least one triangular vertex in the rectangle.

Figure 4:
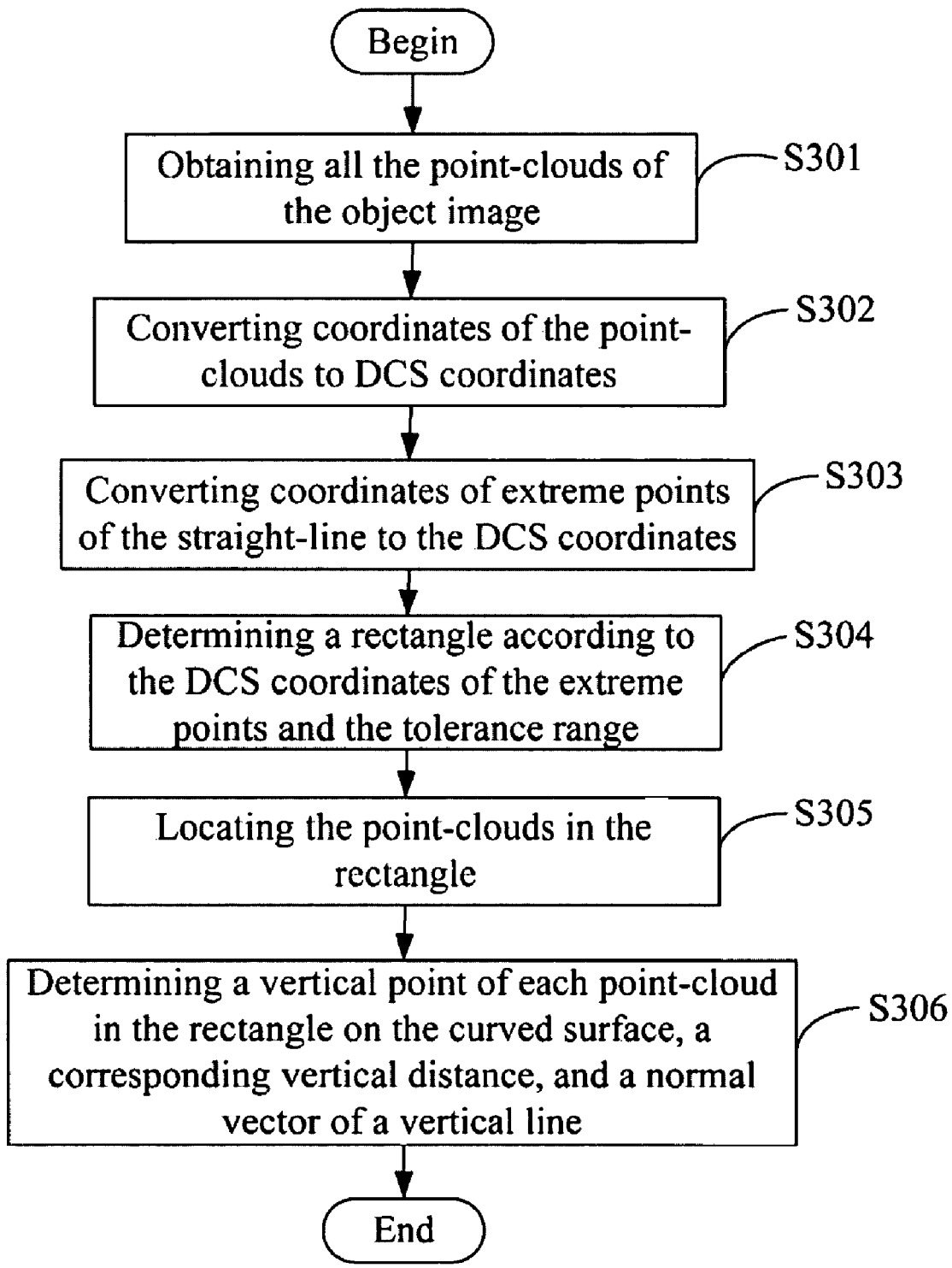
FIG. 4 is a detailed flowchart of block S300 of FIG. 2.

FIG. 4 is a detailed flowchart of block S300 of FIG. 2. In block S301, the measurement module 20 obtains all the point-clouds of the object.

In block S302, the measurement module 20 converts coordinates of the point-clouds to DCS coordinates. In other words, the measurement module 20 converts WCS coordinates of the point-clouds to the DCS coordinates. The WCS coordinates and the DCS coordinates of the point-clouds are stored in two arrays, and the storage location in each array of the point-clouds are the same. For example, the WCS coordinates of the point-clouds are stored in an array pt3ds, the corresponding DCS coordinates of the point-clouds are stored in an array pt2ds. If the WCS coordinate of a point-cloud of "a" is stored in pt3ds[4], the corresponding DCS coordinate of the point-cloud of "a" is stored in pt2ds[4].

In block S303, the measurement module 20 converts the coordinates of extreme points of the straight-line to the DCS coordinates. In other words, the measurement module 20 converts the WCS coordinates of the extreme points of the straight-line to the DCS coordinates.

In block S304, the measurement module 20 determines a rectangle according to the DCS coordinates of the extreme points and the tolerance range. The width of the rectangle is the absolute value of the difference of the X-axis coordinates of the two extreme points. The height of the rectangle is the value of the difference between the maximal up tolerance and the minimal down tolerance in the tolerance range.

In block S305, the measurement module 20 locates the point-clouds in the rectangle. In block S306, the measurement module 20 determines a vertical point of each of the point-clouds in the rectangle on the curved surface, a corresponding vertical distance from each of the point-clouds to the curved surface, and a normal vector of a vertical line from each of the point-clouds to the curved surface.

Figure 5:
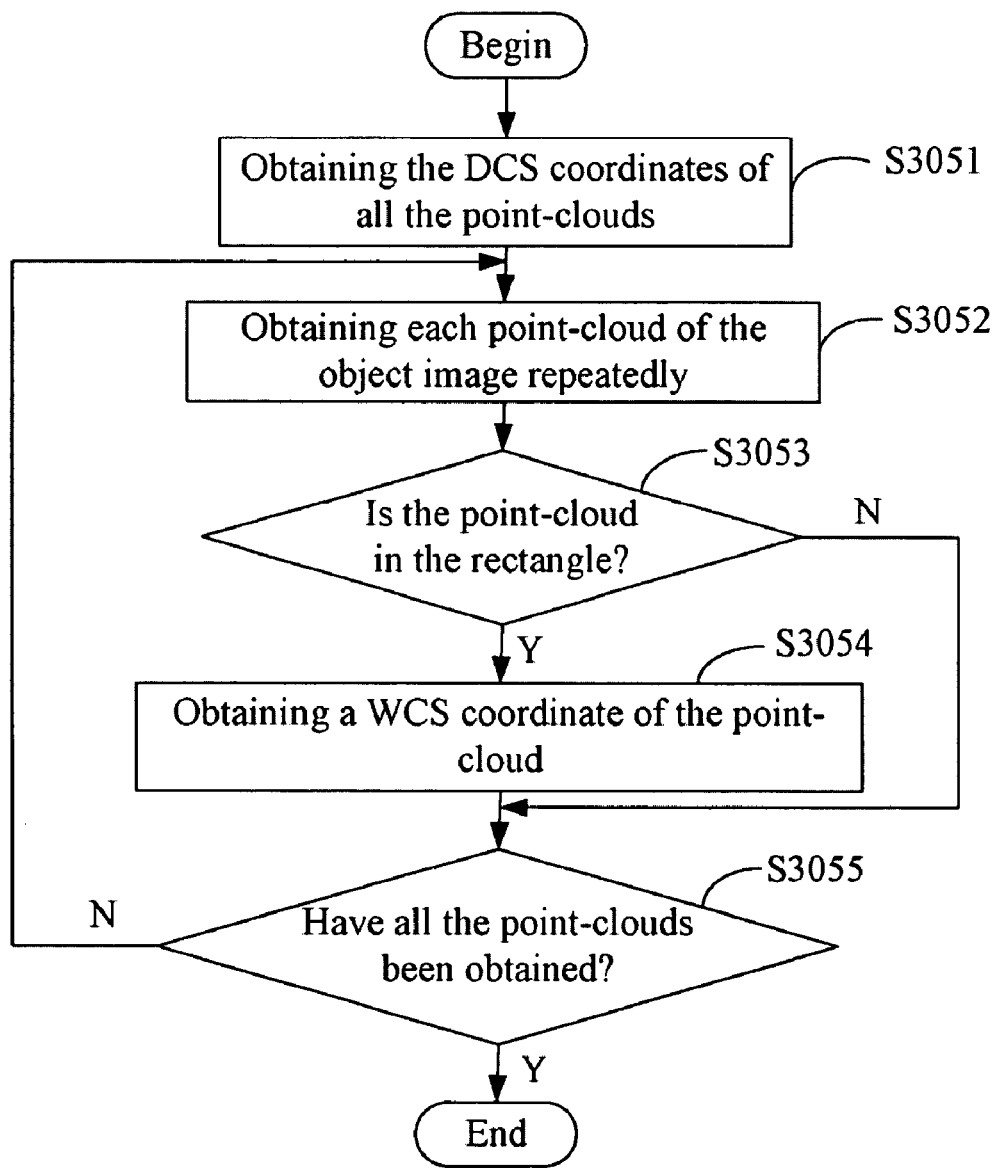
FIG. 5 is a detailed flowchart of block S305 of FIG. 4.

FIG. 5 is a detailed flowchart of block S305 of FIG. 4. In block S3051, the measurement module 20 obtains the DCS coordinates of all the point-clouds.

In block S3052, the measurement module 20 obtains each point-cloud of the object repeatedly. In block S3053, the measurement module 20 determines if the point-cloud is in the rectangle. For example, the DCS coordinates of the point-clouds are stored in the array pt2ds. An expression for determining if the point-cloud is in the rectangle is as follows.

pt2dMin.x<pt2ds[i].x<pt2dMax.x and
pt2dMin.y<pt2ds[i].y<pt2dMax.y

In the expression, "i" represents the array element, "pt2ds[i].x" represents an X-axis coordinate of the point-cloud, "pt2ds[i].y" represents a Y-axis coordinate of the point-cloud, "pt2dMin" represents a minimal vertex in the rectangle (the minimal vertex is a vertex which has the minimal X-axis coordinate and the minimal Y-axis coordinate in the rectangle), "pt2dMax" represents a maximal vertex in the rectangle (the maximal vertex is a vertex which has the maximal X-axis coordinate and the maximal Y-axis coordinate in the rectangle), "pt2dMin.x" represents an X-axis coordinate of the minimal vertex in the rectangle, "pt2dMin.y" represents a Y-axis coordinate of the minimal vertex in the rectangle, "pt2dMax.x" represents an X-axis coordinate of the maximal vertex in the rectangle, "pt2dMax.y" represents a Y-axis coordinate of the maximal vertex in the rectangle. If the condition in the expression is satisfied, the measurement module 20 determines the point-cloud is in the rectangle, the procedure goes to block S3054. Otherwise, the measurement module 20 determines the point-cloud is not in the rectangle, the procedure goes to block S3055.

In block S3054, the measurement module 20 obtains the WCS coordinate of the point-cloud. In block S3055, the measurement module 20 determines if all the point-clouds have been obtained. If any point-cloud has not been obtained, the procedure goes to block S3052. Otherwise, if all the point-clouds have been obtained, the procedure ends.

Figure 6:
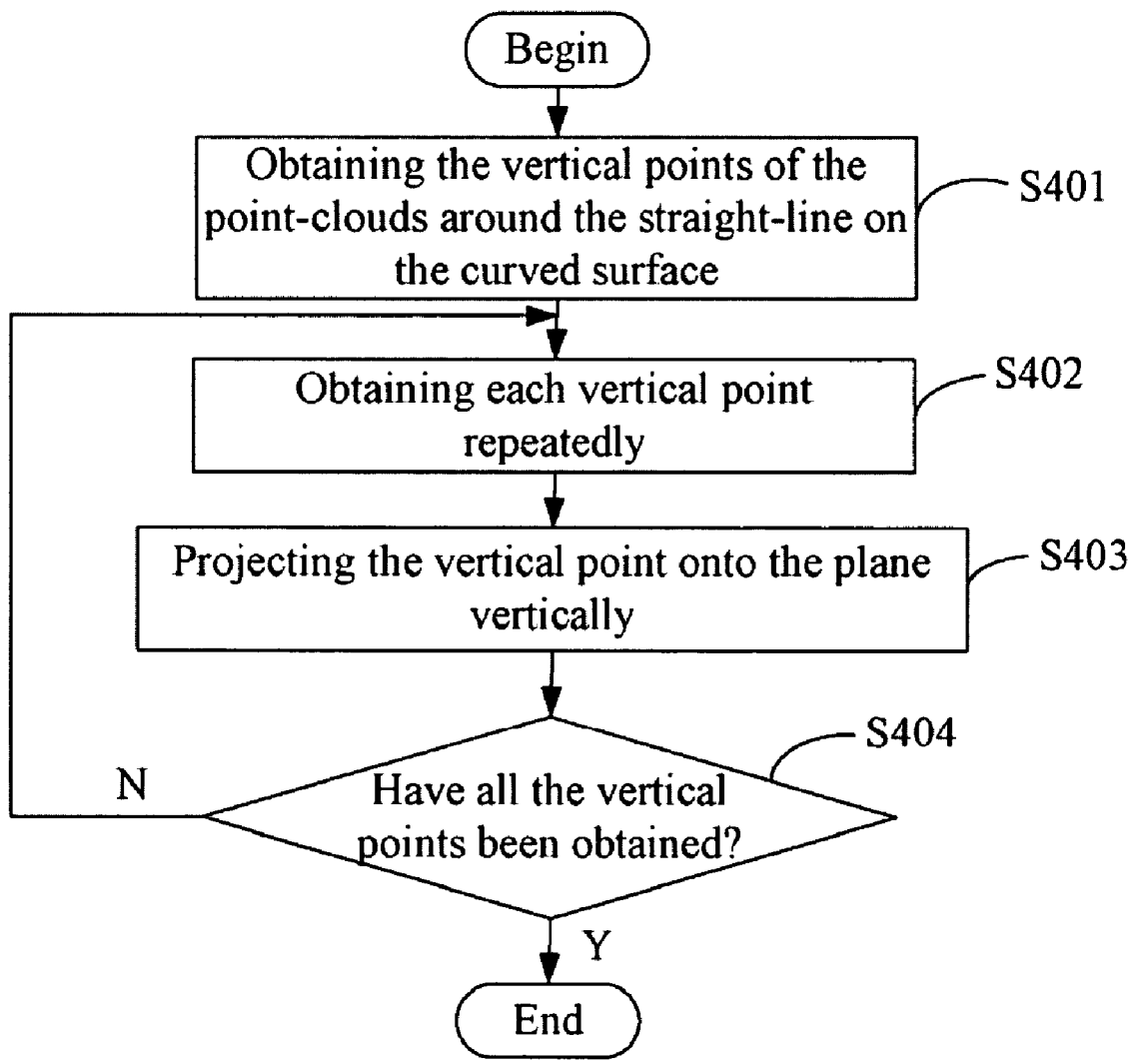
FIG. 6 is a detailed flowchart of block S400 of FIG. 2.

FIG. 6 is a detailed flowchart of block S400 of FIG. 2. In block S401, the measurement module 20 obtains the vertical points of the point-clouds around the straight-line on the curved surface. In block S402, the measurement module 20 obtains each vertical point repeatedly. In block S403, the measurement module 20 projects the vertical point onto the plane vertically thereby generating projection of the point-cloud on the plane. In block S404, the measurement module 20 determines if all the vertical points have been obtained. If any vertical point has not been obtained, the procedure goes to block S402. If all the vertical points have been obtained, the procedure ends.

It should be emphasized that the above-described embodiments of the present disclosure, particularly, any preferred embodiments, are merely possible examples of implementations, merely set forth for a clear understanding of the principles of the present disclosure. Many variations and modifications may be made to the above-described embodiment(s) of the present disclosure without departing substantially from the spirit and principles of the present disclosure. All such modifications and variations are intended to be included herein within the scope of this disclosure and the present disclosure and protected by the following claims.

What is claimed is:

1. A computer-implemented method for measuring a selected portion of a curved surface of an object, the method comprising:
   (a) displaying a straight-line across an object along an axial vector of an X-axis of a current visual angle;
   (b) stretching the straight-line to form a plane according to an axial vector of a Z-axis of the current visual angle, and determining a plurality of intersection points between the plane and the curved surface of the object, wherein the curved surface of the object comprises a plurality of point-clouds;
   (c) determining a vertical point of each point-cloud around the straight-line on the curved surface, a corresponding vertical distance from each of the point-clouds to the curved surface, and a corresponding normal vector of a vertical line from each of the point-clouds to the curved surface;
   (d) projecting the vertical points onto the plane vertically so as to generate projections of the point-clouds on the plane;
   (e) determining a plurality of measured points, a plurality of up tolerance points, and a plurality of down tolerance points for each of the plurality of the point-clouds around the straight-line on the plane according to the projections, the corresponding vertical distance, and the corresponding normal vector of the vertical line;
   (f) connecting each of the measured points so as to generate a measured line, connecting the intersection points between the plane and the curved surface so as to generate an intersection line, connecting each projection and a corresponding measured point of each of the projections so as to generate connected lines, connecting the up tolerance points so as to generate an up tolerance line, and connecting the down tolerance points so as to generate a down tolerance line; and
   (g) determining if one or more dimensions of a selected portion around the straight-line of the object is acceptable by determining one of if a deviation of the measured line from the intersection line is acceptable, and by determining if each connected line is inside an area between the up tolerance line and the down tolerance line.

2. The method according to claim 1, wherein block (a) further comprises: setting display colors for the measured line, the intersection line, the connected lines between the projections and the corresponding measured points, the up tolerance line, and the down tolerance line.

3. The method according to claim 1, wherein block (b) comprises:
   (b1) converting the curved surface to a triangular grid, wherein vertexes of each triangle in the triangular grid can be expressed in a world coordinate system (WCS);
   (b2) converting the world coordinate system (WCS) coordinates of vertexes of each triangle in the triangular grid to a display coordinate system (DCS) coordinates, wherein a straight-line comprises two extreme points;
   (b3) converting the WCS coordinates of the two extreme points of the straight-line to the DCS coordinates;
   (b4) determining a rectangle according to the DCS coordinates of the extreme points and a tolerance range, wherein the width of the rectangle is an absolute value of a difference of the X-axis coordinates of the two extreme points, and the height of the rectangle is a value of a difference between a maximal up tolerance and a minimal down tolerance in the tolerance range;
   (b5) locating vertexes of all triangles in the rectangle; and
   (b6) determining intersection points between the plane and the triangles as the intersection points between the plane and the curved surface, wherein each of the triangles has at least one triangular vertex in the rectangle.

4. The method according to claim 3, wherein block (c) comprises:
   (c1) obtaining all the point-clouds of the object;
   (c2) converting WCS coordinates of the point-clouds to DCS coordinates;
   (c3) converting the WCS coordinates of the extreme points of the straight-line to the DCS coordinates;
   (c4) determining a rectangle according to the DCS coordinates of the extreme points and the tolerance range, wherein the width of the rectangle is the absolute value of the difference of the X-axis coordinates of the two extreme points, and the height of the rectangle is the value of the difference between the maximal up tolerance and the minimal down tolerance in the tolerance range;
   (c5) locating the point-clouds in the rectangle; and
   (c6) determining a vertical point of each of the point-clouds in the rectangle on the curved surface, a corresponding vertical distance from each of the point-clouds to the curved surface, and a normal vector of a vertical line from each of the point-clouds to the curved surface.

5. The method according to claim 4, wherein locating the point-clouds in the rectangle in block (c5) is by way of:
   determining that an X-axis coordinate of a point-cloud is greater than an X-axis coordinate of a minimal vertex in the rectangle and is less than an X-axis coordinate of a maximal vertex in the rectangle; and
   determining that a Y-axis coordinate of the point-cloud is greater than a Y-axis coordinate of the minimal vertex in the rectangle and is less than a Y-axis coordinate of the maximal vertex in the rectangle.

6. The method according to claim 1, wherein determining the measured points in block (e) comprises determining an X-axis coordinate of a measured point, a Y-axis coordinate of the measured point, and a Z-axis coordinate of the measured point, wherein:
   the X-axis coordinate of the measured point equals to an X-axis coordinate of a corresponding projection to the X-axis coordinate of the measured point+the vertical distance from a corresponding point-cloud to the curved surface * the X-axis normal vector of the vertical line;
   the Y-axis coordinate of the measured point equals to a Y-axis coordinate of a corresponding projection to the Y-axis coordinate of the measured point+the vertical distance from a corresponding point-cloud to the curved surface * the Y-axis normal vector of the vertical line; and
   the Z-axis coordinate of the measured point equals to a Z-axis coordinate of a corresponding projection to the Z-axis coordinate of the measured point+the vertical distance from a corresponding point-cloud to the curved surface * the Z-axis normal vector of the vertical line.

7. The method according to claim 1, wherein determining the up tolerance points in block (e) comprises determining an X-axis coordinate of an up tolerance point, a Y-axis coordinate of the up tolerance point, a Z-axis coordinate of the up tolerance point, wherein:

the X-axis coordinate of the up tolerance point equals to an X-axis coordinate of a corresponding projection to the X-axis coordinate of the up tolerance point+the value of the maximal up tolerance * the X-axis normal vector of the vertical line;

the Y-axis coordinate of the up tolerance point equals to a Y-axis coordinate of a corresponding projection to the Y-axis coordinate of the up tolerance point+the value of the maximal up tolerance * the Y-axis normal vector of the vertical line;

the Z-axis coordinate of the up tolerance point equals to a Z-axis coordinate of a corresponding projection to the Z-axis coordinate of the up tolerance point+the value of the maximal up tolerance * the Z-axis normal vector of the vertical line.

8. The method according to claim 1, wherein determining the down tolerance points in block (e) comprises determining an X-axis coordinate of a down tolerance point, a Y-axis coordinate of the down tolerance point, a Z-axis coordinate of the down tolerance point, wherein:

the X-axis coordinate of the down tolerance point equals to an X-axis coordinate of a corresponding projection to the X-axis coordinate of the down tolerance point+the value of the minimal down tolerance * the X-axis normal vector of the vertical line;

the Y-axis coordinate of the down tolerance point equals to a Y-axis coordinate of a corresponding projection to the Y-axis coordinate of the down tolerance point+the value of the minimal down tolerance * the Y-axis normal vector of the vertical line;

the Z-axis coordinate of the down tolerance point equals to a Z-axis coordinate of a corresponding projection to the Z-axis coordinate of the down tolerance point+the value of the minimal down tolerance * the Z-axis normal vector of the vertical line.

9. A computer-readable medium having stored thereon instructions for measuring a selected portion of a curved surface of an object, the computer-readable medium, when executed by a computer, causing the computer to:

(a) display a straight-line across the object along an axial vector of an X-axis of a current visual angle;

(b) stretch the straight-line to form a plane according to an axial vector of a Z-axis of the current visual angle, and determine a plurality of intersection points between the plane and the curved surface of the object, wherein the curved surface of the object comprises a plurality of point-clouds;

(c) determine a vertical point of each point-cloud around the straight-line on the curved surface, a corresponding vertical distance from each of the point-clouds to the curved surface, and a corresponding normal vector of a vertical line from each of the point-clouds to the curved surface;

(d) project the vertical points onto the plane vertically so as to generate projections of the point-clouds on the plane;

(e) determine a plurality of measured points, a plurality of up tolerance points, and a plurality of down tolerance points for each of the plurality of the point-clouds around the straight-line on the plane according to the projections, the corresponding vertical distance, and the corresponding normal vector of the vertical line;

(f) connect each of the measured points so as to generate a measured line, connect the intersection points between the plane and the curved surface so as to generate an intersection line, connect each projection and a corresponding measured point of each of the projections so as to generate connected lines, connect the up tolerance points so as to generate an up tolerance line, and connect the down tolerance points so as to generate a down tolerance line; and (g) determine if one or more dimensions of a selected portion around the straight-line of the object is acceptable by determining one of if a deviation of the measured line from the intersection line is acceptable, and by determining if each connected line is inside an area between the up tolerance line and the down tolerance line.

10. The method of claim 9, wherein the storage system is at least one of a hard disk drive, a compact disc, a digital video disc, and a tape drive.

* * * * *